(12) United States Patent
Abro (10) Patent No.: US 8,366,166 B2
(45) Date of Patent: Feb. 5, 2013

(54) DUCT ANTI-ROTATION ATTACHMENT FLANGE

(75) Inventor: Lauren M. Abro, Farmington Hills, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1400 days.

(21) Appl. No.: 12/027,324

(22) Filed: Feb. 7, 2008

(65) Prior Publication Data

US 2009/0203305 A1 Aug. 13, 2009

(51) Int. Cl.
*B60R 13/00* (2006.01)

(52) U.S. Cl. ..................... 296/24.34; 296/208
(58) Field of Classification Search .............. 296/24.34, 296/37.8, 208; 454/141–144
See application file for complete search history.

(56) References Cited

U.S. PATENT DOCUMENTS

| | | | |
|---|---|---|---|
| 3,724,357 A | 4/1973 | Kavthekar et al. | |
| 4,440,434 A | 4/1984 | Celli et al. | |
| 4,512,239 A * | 4/1985 | Watanabe et al. | 454/144 |
| 5,613,699 A | 3/1997 | Schambre | |
| 5,762,395 A * | 6/1998 | Merrifield et al. | 296/203.01 |
| 6,095,595 A | 8/2000 | Galbraith | |
| 6,152,522 A * | 11/2000 | Boulay et al. | 296/208 |
| 6,338,514 B1 * | 1/2002 | Arold et al. | 296/24.34 |
| 6,341,814 B1 * | 1/2002 | Honninger et al. | 296/208 |
| 6,676,202 B2 | 1/2004 | Brancheriau et al. | |
| 6,834,913 B2 | 12/2004 | Reed et al. | |
| 6,921,127 B2 | 7/2005 | Feith et al. | |
| 7,118,154 B2 | 10/2006 | Yamazaki et al. | |
| 7,396,062 B2 * | 7/2008 | Hung et al. | 296/24.34 |
| 2004/0108744 A1 | 6/2004 | Scheib et al. | |
| 2004/0145208 A1 * | 7/2004 | Kapteyn | 296/70 |
| 2004/0160089 A1 * | 8/2004 | Gupta et al. | 296/208 |
| 2005/0280288 A1 | 12/2005 | Suzuki et al. | |
| 2005/0285433 A1 | 12/2005 | Baudouin | |
| 2006/0017309 A1 * | 1/2006 | Wolf | 296/193.02 |

* cited by examiner

*Primary Examiner* — Lori Lyjak
(74) *Attorney, Agent, or Firm* — Gifford, Krass, Sprinkle, Anderson & Citkowski, P.C.

(57) ABSTRACT

An air duct assembly for a motor vehicle is provided. The air duct assembly can include a U-shaped duct having a center portion with a first air duct and a second air duct extending therefrom. In addition, the center portion of the U-shaped duct can have a flange attached to and extending outwardly therefrom, the flange having a predetermined thickness. The U-shaped duct attaches to a console within the motor vehicle, the console having a surface with a first arm and a second arm extending outwardly therefrom. The second arm can be oppositely disposed and spaced apart from the first arm a predetermined distance. The predetermined distance between the first and second arms extending from the console can be generally equal to the predetermined thickness of the flange extending from the center portion of the U-shaped duct, for the purpose of attaching the U-shaped duct to the console.

14 Claims, 2 Drawing Sheets

Fig-3

DUCT ANTI-ROTATION ATTACHMENT FLANGE

FIELD OF THE INVENTION

The present invention relates to molded air ducts for automotive vehicles and, more particularly, to an improved molded air duct which has an anti-rotation attachment flange.

BACKGROUND OF THE INVENTION

Molded air ducts are commonly used in motor vehicles and can be located throughout the vehicle in order to direct air to various locations of a passenger compartment. Typically, molded air ducts contain a plurality of attachment points which require separate assembly and/or attachment to adjacent motor vehicle components such that the air duct is secure and will not vibrate and/or rotate during normal operation. However, the use of multiple attachment points increases the complexity of the molded air duct component, the complexity of the adjacent motor vehicle components where the air duct will be attached and the time and effort for attaching the air duct properly within the motor vehicle during assembly. As such, an improved air duct having a single attachment location that prevents vibration and/or rotation of the component during normal operation would be desirable.

SUMMARY OF THE INVENTION

An air duct assembly for a motor vehicle is provided. The air duct assembly can include a U-shaped duct having a center portion with a first air duct and a second air duct extending therefrom. In addition, the center portion of the U-shaped duct can have a flange attached to and extending outwardly therefrom, the flange having a predetermined thickness. The U-shaped duct attaches to a console within the motor vehicle, the console having a surface with a first arm and a second arm extending outwardly therefrom. The second arm can be oppositely disposed and spaced apart from the first arm a predetermined distance. The predetermined distance between the first and second arms extending from the console can be generally equal to the predetermined thickness of the flange extending from the center portion of the U-shaped duct, for the purpose of attaching the U-shaped duct to the console.

In some instances, the flange is integral with the U-shaped duct. The first and second arms have a width and a length, the width being at least three times greater than the length. In other instances, the console can be a center console of the motor vehicle and the surface of the console is a front surface of the center console. The flange can attach between the first and second arms using an interference fit and/or apertures can be provided through the flange and the first and second arms such that an attachment device such as a rod, self-tapping screw, pin and the like can be placed therethrough. By attaching the U-shaped duct to the console in the motor vehicle using the flange extending from the U-shaped duct and the first and second arms extending from the console, an anti-rotation air duct assembly is provided.

DETAILED DESCRIPTION OF THE INVENTION

The present invention discloses an air duct assembly wherein a U-shaped duct having a flange extending therefrom and a first and second arm extending from a console provide an anti-rotation duct assembly. As such, the air duct assembly disclosed herein has utility as a motor vehicle component.

The air duct assembly can include a generally U-shaped duct that has a center portion with a first duct and a second duct extending therefrom. A flange can be attached to and extend outwardly from the center portion of the U-shaped duct, the flange having a predetermined thickness. In some instances, the flange can have an aperture therethrough. A corresponding console within the motor vehicle can be provided, the console having a surface with a first arm and a second arm that extend outwardly therefrom, the second arm being oppositely disposed and spaced apart from the first arm a predetermined distance. The predetermined distance between the first and second arms that extend from the console can be generally equal to the predetermined thickness of the flange, thereby affording for the flange to fit between the first and second arms. In some instances, the first and second arms can have an aperture therethrough, the apertures within the first and second arms dimensioned and located to align with the aperture within the flange of the duct when the U-shaped duct is assembled with the console.

In some instances, the predetermined thickness of the flange and the predetermined distance between the first and second arms provide for an interference fit when the flange is inserted between the arms. In other instances, an attachment pin in the form of a bolt, rod, pin, self-tapping screw and the like can be inserted within the apertures that may be present through the flange and the first and second arms in order to aid in the attachment of the U-shaped duct to the console. It is also appreciated that other attachment mechanisms can be used to attach the flange extending from the U-shaped duct to the console, illustratively including adhesives, tape, welding, hook-and-loop fasteners and the like.

The first and second arms extending from the console have a width and a length, the length being the distance that the arms extend outwardly from the surface of the console and the width being the distance that the arms extend along the surface of the console. In some instances, the width of the first and second arms is at least three times greater than the length of the first and second arms. It is appreciated that these dimensions of the first and second arms along with a complementary flange that fits therewithin, provides an attachment of the U-shaped duct to the console such that rotation of the duct during normal operation of the vehicle is prohibited. It is also appreciated that the disclosed air duct assembly makes unnecessary multiple attachment points that have previously been required to prevent rotation of the duct during operation of the vehicle.

Figure 1:
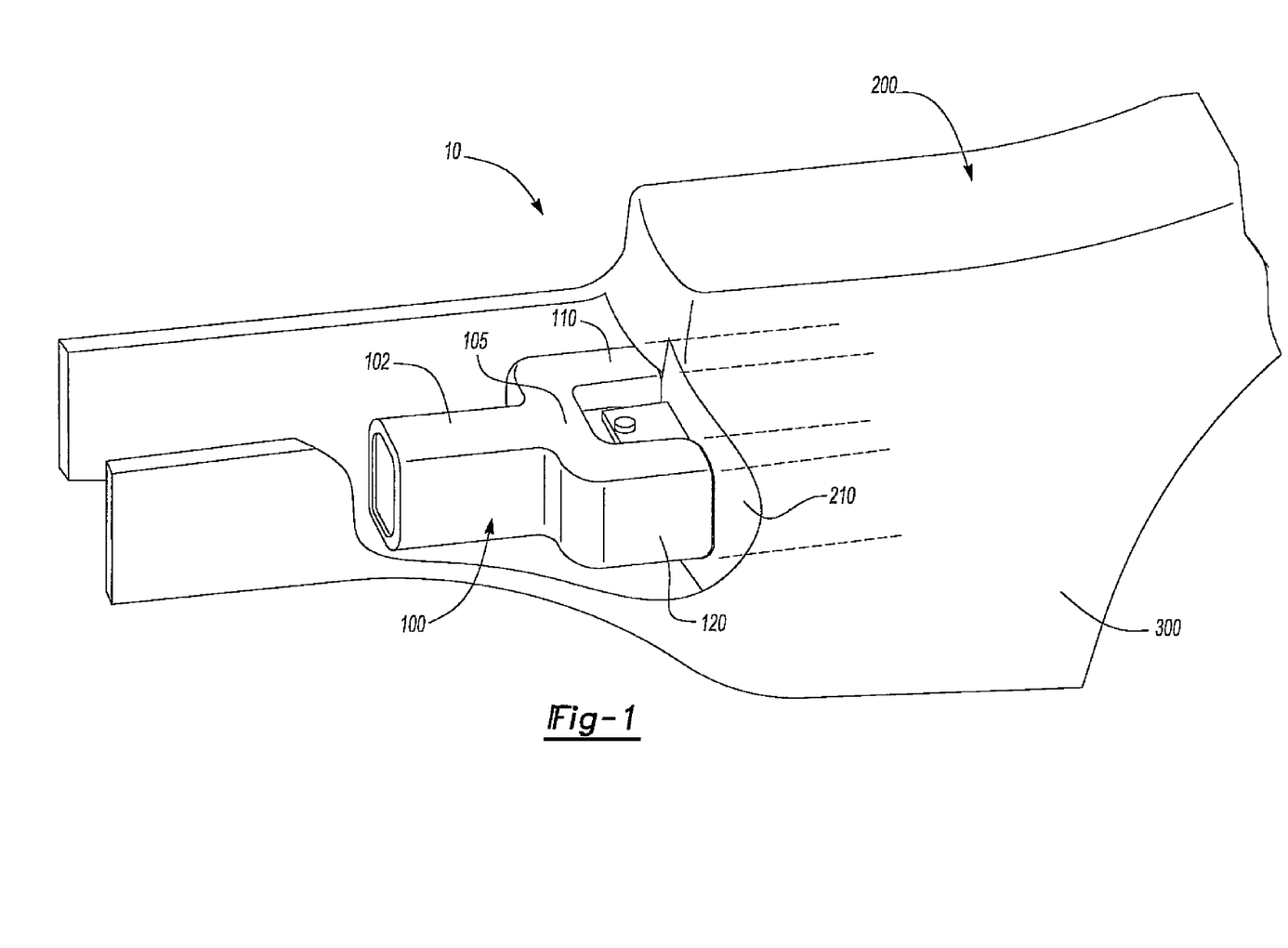
FIG. 1 is a perspective view of an embodiment of the present invention.

Turning now to FIG. 1, a perspective view of an embodiment of an air duct assembly is shown generally at reference numeral 10. The air duct assembly 10 can include a U-shaped duct 100 and a console 200. In some instances, the console 200 is a center console and can optionally have a cover 300 for providing an aesthetically pleasing and safer environment to the passenger compartment of the motor vehicle. The U-shaped duct 100 can have a center portion 105 with a first air duct 110 and a second air duct 120 extending therefrom. It is appreciated that the first air duct 110 and the second air duct 120 extend from the center portion 105 in order to form the U-shaped duct 100. It is also appreciated that an inlet duct portion 102 can optionally be present in order to provide air to or remove air from the center portion 105, first air duct 110 and/or second air duct 120. The console 200 can have a surface 210 with an aperture 220 (FIG. 2), which in some instances is a front surface for a center console.

Figure 2:
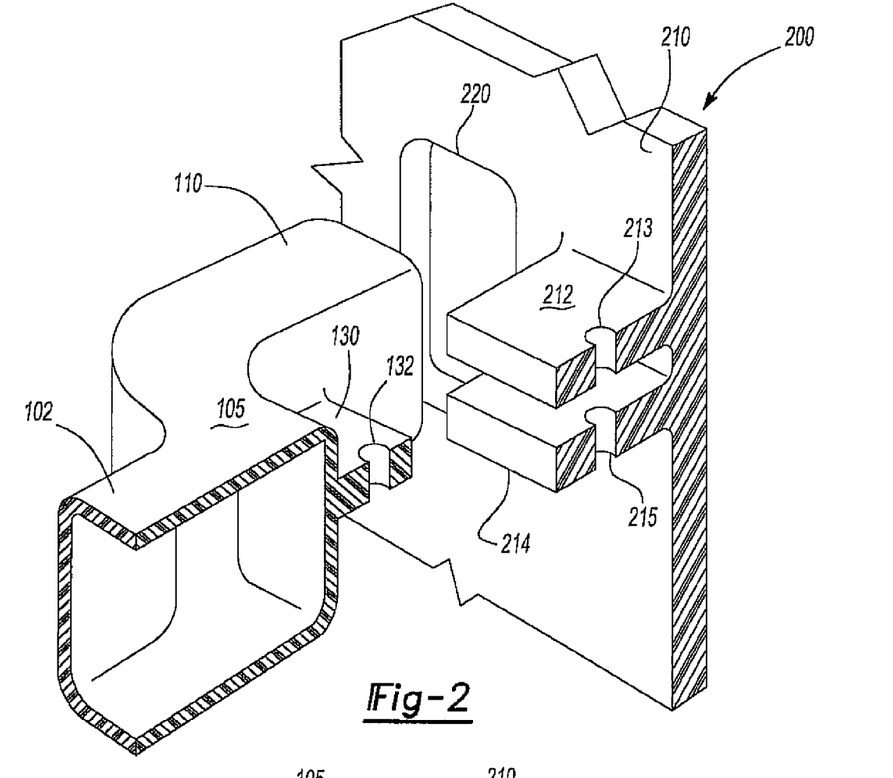
FIG. 2 is a perspective cross-sectional view of an embodiment of the present invention.
Figure 3:
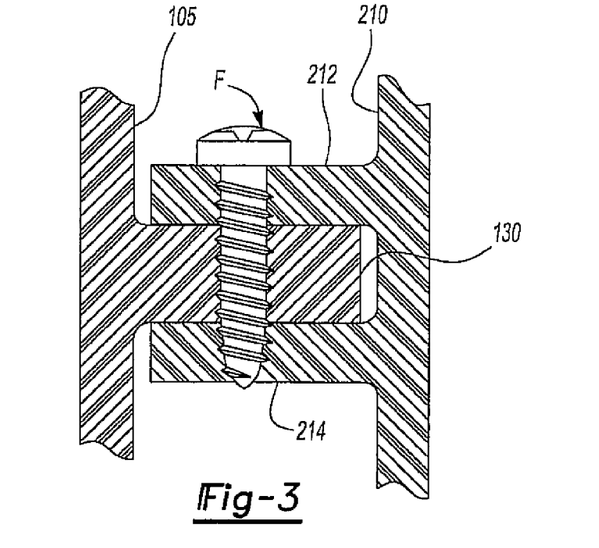
FIG. 3 is a cross-sectional view of the flange and first and second arms shown in FIG. 2.

Turning now to FIGS. 2 and 3, an enlarged view of the attachment region between the U-shaped duct 100 and the console 200 is provided. As illustrated in FIG. 2, the center portion 105 has a flange 130 extending outwardly therefrom. In some instances, the flange 130 can extend completely between and/or to the first air duct 110 and the second air duct 120. In other instances, the flange 130 does not extend completely to the first air duct 110 and/or the second air duct 120. The flange 130 extends outwardly from the center portion 105 in generally the same direction as the first air duct 110 and/or second air duct 120. In addition, the flange 130 can have an optional aperture 132 present therewithin as shown in the figure.

A first arm 212 and a second arm 214 can extend from the console surface 210 in a generally outward direction. In some instances, the surface 210 is the front surface of a center console and the first arm 212 and the second arm 214 extend in a generally forward direction within the motor vehicle. The first arm 212 and the second arm 214 are spaced apart and oppositely disposed from each other and have a predetermined distance therebetween. The predetermined distance between the first arm 212 and the second arm 214 can be generally equal to the thickness of the flange 130, can be greater than the thickness of the flange 130 or can be slightly less than the thickness of the flange 130. In some instances, the predetermined distance between the first arm 212 and the second arm 214 affords for an interference fit when the flange 130 is placed therebetween. As illustrated in FIG. 2, the first arm 212 and second arm 214 can optionally include an aperture 213 and an aperture 215. It is appreciated that the apertures 213 and 215 are dimensioned and located such that the aperture 132, if present within the flange 130, can align therewith and afford for a fastening device F to be inserted as illustrated in FIG. 3.

Turning now specifically to FIG. 3, the U-shaped duct 100 has been attached to the console 200 with the flange 130 inserted between the first arm 212 and the second arm 214. In addition, the fastener F has been screwed within the apertures 213, 132 and 215 respectively. In this manner, a U-shaped duct 100 is attached to a console 200 without the use of multiple attachment points and yet still provides an anti-rotation and anti-vibration attachment mechanism. It is appreciated that the specific dimensions of the flange 130, first arm 212 and second arm 214 will depend on the actual size and shape of the U-shaped duct 100 and thus will be determined by engineering and/or safety standards known to those skilled in the art of motor vehicle design and manufacture.

Also provided is an improved method for assembly of a motor vehicle, the method including providing the U-shaped duct 100 and attaching it to the console 200 with the flange 130 and the first arm 212 and second arm 214 using the above disclosed teachings. It is appreciated that assembly of the U-shaped duct 100 within the motor vehicle does not require a plurality of attachment points and/or reduces the number of attachment points for the installment of the duct. It is further appreciated that the flange 130 assembled between the first arm 212 and second arm 214 provides an anti-rotation attachment mechanism that reduces the complexity and/or number of steps for assembly of the motor vehicle.

The U-shaped duct and the console can be made from any material known to those skilled in the art, illustratively including plastics, metals, alloys, ceramics and the like. In addition, the U-shaped duct and/or the console can be made from blow molding, injection molding, stamping, casting and the like.

The invention is not restricted to the illustrative examples described above. The examples are not intended as limitations on the scope of the invention. Methods, apparatus, and the like described herein are exemplary and not intended as limitations on the scope of the invention. Changes therein and other uses will occur to those skilled in the art. The scope of the invention is defined by the scope of the claims.

I claim:

1. A center console assembly for a motor vehicle, said center console assembly comprising:
   a tray;
   a first side wall, a second side all and a storage compartment extending between the first side wall and the second side wall, each side wall having a top surface on which the tray is supported; and
   a tab extending upwardly from the top surface of the first side wall and extending into a recess in the tray to hold the tray in a retained position and prevent sliding of the tray along the top surfaces of the first side wall and second side wall, the tab having a support surface spaced apart from the top surface of the first side wall, the support surface having opposite trailing and leading ends, the tab having a trailing surface extending between the trailing end of the support surface and the top surface of the first side wall, the tab having a leading surface extending between the leading end of the support surface and the top surface of the first side wall, the leading surface extending at an acute angle relative to the top surface of the first side wall to facilitate insertion of the tab into the recess as the tray is moved along the top surfaces toward the retained position.

2. The center console assembly as set forth in claim 1, wherein the support surface of the tab is generally parallel with the top surface of the first side wall.

3. The center console assembly as set forth in claim 2, wherein the trailing surface of the tab is generally orthogonal relative to the top surface of the first side wall.

4. The center console assembly as set forth in claim 3, wherein the leading surface is sloped at an angle ranging between thirty and forty five degrees relative to the top surface of the first side wall.

5. The center console assembly as set forth in claim 4, wherein the leading surface is substantially planar.

6. The center console assembly as set forth in claim 3 including an end wall extending generally orthogonally between the first side wall and the second side wall.

7. The center console assembly as set forth in claim 6, wherein at least a portion of the tray is constrained between the end wall and the trailing surface of the tab to retain the tray in the retained position.

8. The center console assembly as set forth in claim 7, wherein the end wall and trailing surface are generally parallel to each other.

9. The center console assembly as set forth in claim 7 including a lid pivotally coupled to the end wall for movement between a closed position covering the tray and storage compartment and an open position allowing access to the tray and storage compartment.

10. The center console assembly as set forth in claim 1, wherein the top surfaces of the first and second side walls are generally parallel to each other.

11. The center console assembly as set forth in claim 10, wherein the top surfaces of the first and second side walls are generally co-planar.

12. A center console assembly for a motor vehicle, said center console assembly comprising:

a pair of side walls generally parallel and spaced apart from each other;

a storage compartment extending between the side walls each side wall having a top surface;

a tray supported on the top surfaces of the pair of side walls; and wherein at least one of the side walls includes a tab, the tab extending into a recess formed in the tray to retain the tray in a retained position to prevent the tray from sliding along the side walls, the tab having a ramped leading surface that facilitates insertion of the tab into the recess as the tray is moved along the side walls toward the retained position.

13. A center console assembly as set forth in claim 12, wherein the leading surface extends at an acute angle relative to the direction in which the tray is moved along the side walls toward the retained position, the leading surface contacting the tray as it is moved toward the retained position and causing a portion of the tray to lift from the side wall to facilitate insertion of the tab into the recess in the tray.

14. A center console assembly as set forth in claim 12, wherein the leading surface extends at an angle ranging between thirty degrees and forty five degrees relative to the direction in which the tray is moved along the side walls toward the retained position, the leading surface contacting the tray as it is moved toward the retained position and causing a portion of the tray to lift from the side wall to facilitate insertion of the tab into the recess in the tray.

* * * * *

UNITED STATES PATENT AND TRADEMARK OFFICE
CERTIFICATE OF CORRECTION

PATENT NO. : 8,366,166 B2
APPLICATION NO. : 12/027324
DATED : February 5, 2013
INVENTOR(S) : Abro It is certified that error appears in the above-identified patent and that said Letters Patent is hereby corrected as shown below:

Please delete Patent 8366166 in its entirety and insert Patent 8366166 in its entirety as shown on the attached pages Signed and Sealed this
Fourth Day of August, 2015

Michelle K. Lee
*Director of the United States Patent and Trademark Office*

(12) United States Patent
Abro (10) Patent No.: US 8,366,166 B2
(45) Date of Patent: Feb. 5, 2013

(54) DUCT ANTI-ROTATION ATTACHMENT FLANGE

(75) Inventor: Lauren M. Abro, Farmington Hills, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1400 days.

(21) Appl. No.: 12/027,324

(22) Filed: Feb. 7, 2008

(65) Prior Publication Data
US 2009/0203305 A1    Aug. 13, 2009

(51) Int. Cl.
*B60R 13/00* (2006.01)
*G06F 12/08* (2006.01)

(52) U.S. Cl.
CPC .................................. *G06F 12/08* (2013.01)
USPC ......................................... 296/24.34; 296/208

(58) Field of Classification Search
USPC ............... 296/24.34, 37.8, 208; 454/141–144
See application file for complete search history.

(56) References Cited

U.S. PATENT DOCUMENTS

| | | | |
|---|---|---|---|
| 3,724,357 A | 4/1973 | Kavthekar et al. | |
| 4,440,434 A | 4/1984 | Celli et al. | |
| 4,512,239 A * | 4/1985 | Watanabe et al. | 454/144 |
| 5,613,699 A | 3/1997 | Schambre | |
| 5,762,395 A * | 6/1998 | Merrifield et al. | 296/203.01 |
| 6,095,595 A | 8/2000 | Galbraith | |
| 6,152,522 A * | 11/2000 | Boulay et al. | 296/208 |
| 6,338,514 B1 * | 1/2002 | Arold et al. | 296/24.34 |
| 6,341,814 B1 * | 1/2002 | Honninger et al. | 296/208 |
| 6,676,202 B2 | 1/2004 | Brancheriau et al. | |
| 6,834,913 B2 | 12/2004 | Reed et al. | |
| 6,921,127 B2 | 7/2005 | Feith et al. | |
| 7,118,154 B2 | 10/2006 | Yamazaki et al. | |
| 7,396,062 B2 * | 7/2008 | Hung et al. | 296/24.34 |
| 2004/0108744 A1 | 6/2004 | Scheib et al. | |
| 2004/0145208 A1 * | 7/2004 | Kapteyn | 296/70 |
| 2004/0160089 A1 * | 8/2004 | Gupta et al. | 296/208 |
| 2005/0280288 A1 | 12/2005 | Suzuki et al. | |
| 2005/0285433 A1 | 12/2005 | Baudouin | |
| 2006/0017309 A1 * | 1/2006 | Wolf | 296/193.02 |

* cited by examiner

*Primary Examiner* — Lori Lyjak
(74) *Attorney, Agent, or Firm* — Gifford, Krass, Sprinkle, Anderson & Citkowski, P.C.

(57) ABSTRACT

An air duct assembly for a motor vehicle is provided. The air duct assembly can include a U-shaped duct having a center portion with a first air duct and a second air duct extending therefrom. In addition, the center portion of the U-shaped duct can have a flange attached to and extending outwardly therefrom, the flange having a predetermined thickness. The U-shaped duct attaches to a console within the motor vehicle, the console having a surface with a first arm and a second arm extending outwardly therefrom. The second arm can be oppositely disposed and spaced apart from the first arm a predetermined distance. The predetermined distance between the first and second arms extending from the console can be generally equal to the predetermined thickness of the flange extending from the center portion of the U-shaped duct, for the purpose of attaching the U-shaped duct to the console.

20 Claims, 2 Drawing Sheets

Fig-2

Fig-3

DUCT ANTI-ROTATION ATTACHMENT FLANGE

FIELD OF THE INVENTION

The present invention relates to molded air ducts for automotive vehicles and, more particularly, to an improved molded air duct which has an anti-rotation attachment flange.

BACKGROUND OF THE INVENTION

Molded air ducts are commonly used in motor vehicles and can be located throughout the vehicle in order to direct air to various locations of a passenger compartment. Typically, molded air ducts contain a plurality of attachment points which require separate assembly and/or attachment to adjacent motor vehicle components such that the air duct is secure and will not vibrate and/or rotate during normal operation. However, the use of multiple attachment points increases the complexity of the molded air duct component, the complexity of the adjacent motor vehicle components where the air duct will be attached and the time and effort for attaching the air duct properly within the motor vehicle during assembly. As such, an improved air duct having a single attachment location that prevents vibration and/or rotation of the component during normal operation would be desirable.

SUMMARY OF THE INVENTION

An air duct assembly for a motor vehicle is provided. The air duct assembly can include a U-shaped duct having a center portion with a first air duct and a second air duct extending therefrom. In addition, the center portion of the U-shaped duct can have a flange attached to and extending outwardly therefrom, the flange having a predetermined thickness. The U-shaped duct attaches to a console within the motor vehicle, the console having a surface with a first arm and a second arm extending outwardly therefrom. The second arm can be oppositely disposed and spaced apart from the first arm a predetermined distance. The predetermined distance between the first and second arms extending from the console can be generally equal to the predetermined thickness of the flange extending from the center portion of the U-shaped duct, for the purpose of attaching the U-shaped duct to the console.

In some instances, the flange is integral with the U-shaped duct. The first and second arms have a width and a length, the width being at least three times greater than the length. In other instances, the console can be a center console of the motor vehicle and the surface of the console is a front surface of the center console. The flange can attach between the first and second arms using an interference fit and/or apertures can be provided through the flange and the first and second arms such that an attachment device such as a rod, self-tapping screw, pin and the like can be placed therethrough. By attaching the U-shaped duct to the console in the motor vehicle using the flange extending from the U-shaped duct and the first and second arms extending from the console, an anti-rotation air duct assembly is provided.

BRIEF DESCRIPTION OF THE DRAWINGS

FIG. 1 is a perspective view of an embodiment of the present invention;

FIG. 2 is a perspective cross-sectional view of an embodiment of the present invention; and FIG. 3 is a cross-sectional view of the flange and first and second arms shown in FIG. 2.

DETAILED DESCRIPTION OF THE INVENTION

The present invention discloses an air duct assembly wherein a U-shaped duct having a flange extending therefrom and a first and second arm extending from a console provide an anti-rotation duct assembly. As such, the air duct assembly disclosed herein has utility as a motor vehicle component.

The air duct assembly can include a generally U-shaped duct that has a center portion with a first duct and a second duct extending therefrom. A flange can be attached to and extend outwardly from the center portion of the U-shaped duct, the flange having a predetermined thickness. In some instances, the flange can have an aperture therethrough. A corresponding console within the motor vehicle can be provided, the console having a surface with a first arm and a second arm that extend outwardly therefrom, the second arm being oppositely disposed and spaced apart from the first arm a predetermined distance. The predetermined distance between the first and second arms that extend from the console can be generally equal to the predetermined thickness of the flange, thereby affording for the flange to fit between the first and second arms. In some instances, the first and second arms can have an aperture therethrough, the apertures within the first and second arms dimensioned and located to align with the aperture within the flange of the duct when the U-shaped duct is assembled with the console.

In some instances, the predetermined thickness of the flange and the predetermined distance between the first and second arms provide for an interference fit when the flange is inserted between the arms. In other instances, an attachment pin in the form of a bolt, rod, pin, self-tapping screw and the like can be inserted within the apertures that may be present through the flange and the first and second arms in order to aid in the attachment of the U-shaped duct to the console. It is also appreciated that other attachment mechanisms can be used to attach the flange extending from the U-shaped duct to the console, illustratively including adhesives, tape, welding, hook-and-loop fasteners and the like.

The first and second arms extending from the console have a width and a length, the length being the distance that the arms extend outwardly from the surface of the console and the width being the distance that the arms extend along the surface of the console. In some instances, the width of the first and second arms is at least three times greater than the length of the first and second arms. It is appreciated that these dimensions of the first and second arms along with a complementary flange that fits therewithin, provides an attachment of the U-shaped duct to the console such that rotation of the duct during normal operation of the vehicle is prohibited. It is also appreciated that the disclosed air duct assembly makes unnecessary multiple attachment points that have previously been required to prevent rotation of the duct during operation of the vehicle.

Turning now to FIG. 1, a perspective view of an embodiment of an air duct assembly is shown generally at reference numeral 10. The air duct assembly 10 can include a U-shaped duct 100 and a console 200. In some instances, the console 200 is a center console and can optionally have a cover 300 for providing an aesthetically pleasing and safer environment to the passenger compartment of the motor vehicle. The U-shaped duct 100 can have a center portion 105 with a first air duct 110 and a second air duct 120 extending therefrom. It is appreciated that the first air duct 110 and the second air duct 120 extend from the center portion 105 in order to form the U-shaped duct 100. It is also appreciated that an inlet duct portion 102 can optionally be present in order to provide air to or remove air from the center portion 105, first air duct 110 and/or second air duct 120. The console 200 can have a surface 210 with an aperture 220 (FIG. 2), which in some instances is a front surface for a center console.

Turning now to FIGS. 2 and 3, an enlarged view of the attachment region between the U-shaped duct 100 and the console 200 is provided. As illustrated in FIG. 2, the center portion 105 has a flange 130 extending outwardly therefrom. In some instances, the flange 130 can extend completely between and/or to the first air duct 110 and the second air duct 120. In other instances, the flange 130 does not extend completely to the first air duct 110 and/or the second air duct 120. The flange 130 extends outwardly from the center portion 105 in generally the same direction as the first air duct 110 and/or second air duct 120. In addition, the flange 130 can have an optional aperture 132 present therewithin as shown in the figure.

A first arm 212 and a second arm 214 can extend from the console surface 210 in a generally outward direction. In some instances, the surface 210 is the front surface of a center console and the first arm 212 and the second arm 214 extend in a generally forward direction within the motor vehicle. The first arm 212 and the second arm 214 are spaced apart and oppositely disposed from each other and have a predetermined distance therebetween. The predetermined distance between the first arm 212 and the second arm 214 can be generally equal to the thickness of the flange 130, can be greater than the thickness of the flange 130 or can be slightly less than the thickness of the flange 130. In some instances, the predetermined distance between the first arm 212 and the second arm 214 affords for an interference fit when the flange 130 is placed therebetween. As illustrated in FIG. 2, the first arm 212 and second arm 214 can optionally include an aperture 213 and an aperture 215. It is appreciated that the apertures 213 and 215 are dimensioned and located such that the aperture 132, if present within the flange 130, can align therewith and afford for a fastening device F to be inserted as illustrated in FIG. 3.

Turning now specifically to FIG. 3, the U-shaped duct 100 has been attached to the console 200 with the flange 130 inserted between the first arm 212 and the second arm 214. In addition, the fastener F has been screwed within the apertures 213, 132 and 215 respectively. In this manner, a U-shaped duct 100 is attached to a console 200 without the use of multiple attachment points and yet still provides an anti-rotation and anti-vibration attachment mechanism. It is appreciated that the specific dimensions of the flange 130, first arm 212 and second arm 214 will depend on the actual size and shape of the U-shaped duct 100 and thus will be determined by engineering and/or safety standards known to those skilled in the art of motor vehicle design and manufacture.

Also provided is an improved method for assembly of a motor vehicle, the method including providing the U-shaped duct 100 and attaching it to the console 200 with the flange 130 and the first arm 212 and second arm 214 using the above disclosed teachings. It is appreciated that assembly of the U-shaped duct 100 within the motor vehicle does not require a plurality of attachment points and/or reduces the number of attachment points for the installment of the duct. It is further appreciated that the flange 130 assembled between the first arm 212 and second arm 214 provides an anti-rotation attachment mechanism that reduces the complexity and/or number of steps for assembly of the motor vehicle.

The U-shaped duct and the console can be made from any material known to those skilled in the art, illustratively including plastics, metals, alloys, ceramics and the like. In addition, the U-shaped duct and/or the console can be made from blow molding, injection molding, stamping, casting and the like.

The invention is not restricted to the illustrative examples described above. The examples are not intended as limitations on the scope of the invention. Methods, apparatus, and the like described herein are exemplary and not intended as limitations on the scope of the invention. Changes therein and other uses will occur to those skilled in the art. The scope of the invention is defined by the scope of the claims.

I claim:

1. An air duct assembly for a motor vehicle comprising:
   a U-shaped duct having a center portion with a first air duct and a second air duct extending therefrom;
   a flange attached to and extending outwardly from said center portion, said flange having a predetermined thickness;
   a console within the motor vehicle having a surface with a first arm and a second arm extending outwardly therefrom, said second arm being oppositely disposed and spaced apart from said first arm a predetermined distance;
   said predetermined distance between said first and second arms being generally equal to said predetermined thickness of said flange, for the purpose of attaching said U-shaped duct to said center console by placing said flange between said first and second arms and preventing said U-shaped duct from rotating.

2. The air duct assembly of claim 1, wherein said flange is integral with said U-shaped duct.

3. The air duct assembly of claim 1, wherein said first and second arms have a width and a length, said width being at least three times greater than said length.

4. The air duct assembly of claim 1, wherein said console is a center console of the motor vehicle.

5. The air duct assembly of claim 4, wherein said surface is a front surface of said center console.

6. The air duct assembly of claim 1, wherein said flange attaches to said first arm and said second arm with an interference fit.

7. The air duct assembly of claim 1, wherein said flange, said first arm and said second arm each have an aperture therethrough, said apertures dimensioned and located such that said apertures align when said flange is located between said first and second arms.

8. The air duct assembly of claim 7, further comprising an attachment pin dimensioned to slide within said apertures, for the purpose of attaching said U-shaped duct to said console.

9. The air duct assembly of claim 1, wherein said U-shaped duct is a blow-molded duct.

10. An air duct assembly for a motor vehicle comprising:
    a U-shaped duct having a center portion with a first air duct and a second air duct extending therefrom to form said U-shaped duct;
    a flange attached to and extending outwardly from said center portion, said flange having a predetermined thickness;
    a center console within the motor vehicle having a surface with a first arm and a second arm extending outwardly therefrom, said second arm being oppositely disposed and spaced apart from said first arm a predetermined distance;
    said predetermined distance between said first and second arms being generally equal to said predetermined thickness of said flange, for the purpose of attaching said U-shaped duct to said center console and preventing said U-shaped duct from rotating.

11. The air duct assembly of claim 10, wherein said flange is integral with said U-shaped duct.

12. The air duct assembly of claim 10, wherein said first and second arms have a width and a length, said width being at least three times greater than said length.

13. The air duct assembly of claim 10, wherein said surface is a front surface of said center console.

14. The air duct assembly of claim 10, wherein said flange attaches to said first arm and said second arm with an interference fit.

15. The air duct assembly of claim 10, wherein said flange, said first arm and said second arm each have an aperture therethrough, said apertures dimensioned and located such that said apertures align when said flange is located between said first and second arms.

16. The air duct assembly of claim 15, further comprising an attachment pin dimensioned to slide within said apertures, for the purpose of attaching said U-shaped duct to said console.

17. The air duct assembly of claim 1, wherein said U-shaped duct is a blow-molded duct.

18. An air duct assembly for a motor vehicle comprising:
a U-shaped duct having a center portion with a first air duct and a second air duct extending therefrom;
a flange attached to and extending outwardly from said center portion in a direction generally parallel to an extension direction of at least one of said first and second arms, said flange having a predetermined thickness and an aperture therethrough; and
a center console within the motor vehicle having a sandwich clip made from a front surface with a first arm and a second arm extending outwardly therefrom;
said first and second arms each having an aperture therethrough and said second arm being oppositely disposed and spaced apart from said first arm a predetermined distance to form said sandwich clip;
said predetermined distance between said first and second arms being generally equal to said predetermined thickness of said flange and said apertures through said flange and said first and second arms dimensioned and located such that said apertures align when said flange is located between said first and second arms, for the purpose of attaching said U-shaped duct to said center console and preventing said U-shaped duct from rotating.

19. The air duct assembly of claim 18, wherein said flange is integral with said U-shaped duct.

20. The air duct assembly of claim 19, wherein said first and second arms have a width and a length, said width being at least three times greater than said length.

* * * * *